United States Patent

Fomin

[15] 3,642,098
[45] Feb. 15, 1972

[54] LUBRICATOR FOR OILING THE CONTACT SURFACES OF ELECTRICAL CONNECTOR ELEMENTS OF LEADING-IN CURRENT WIRES IN DRILL

[72] Inventor: Igor Alexandrovich Fomin, Mikhalkousky proezd, 20, Kopus 1, Kv. 34, Moscow, U.S.S.R.

[22] Filed: Jan. 16, 1969

[21] Appl. No.: 791,724

[52] U.S. Cl. .................................184/14, 308/88, 184/1 R
[51] Int. Cl. ............................................................F16n 3/00
[58] Field of Search ................222/108, 187; 184/14, 16, 64, 184/102, 25, 19, 20, 1; 308/88, 243

[56] References Cited

UNITED STATES PATENTS

| 2,657,958 | 11/1953 | Tagliaferri et al | 308/88 UX |
| 2,657,763 | 11/1953 | Rotter et al | 184/28 |
| 2,846,495 | 8/1958 | Link | 184/64 X |
| 2,951,557 | 9/1960 | Jung | 184/16 X |
| 3,038,558 | 6/1962 | Plummer | 184/16 |
| 3,113,337 | 12/1963 | Lyden | 184/16 X |

FOREIGN PATENTS OR APPLICATIONS

| 1,221,028 | 1/1960 | France | 184/16 |

Primary Examiner—Manuel A. Antonakas
Attorney—Waters, Roditi, Schwartz & Nissen

[57] ABSTRACT

A lubricator is provided with a reservoir for containing lubricant. Connected to the reservoir is a casing in which is provided an elastic material adapted for contacting the surface of an object to be lubricated. A channel is provided to direct lubricant from the reservoir to the elastic material. Interposed between the reservoir and the elastic material is a metering device adapted for passing a predetermined quantity of lubricant to said channel and said elastic material.

3 Claims, 2 Drawing Figures

3,642,098

LUBRICATOR FOR OILING THE CONTACT SURFACES OF ELECTRICAL CONNECTOR ELEMENTS OF LEADING-IN CURRENT WIRES IN DRILL

The present invention relates to auxiliary equipment employed during drilling wells with the use of electric drills, and more particularly to lubricators for oiling contact surfaces of the elements of connectors of leading-in current wires in drill pipes on which the electric drill is lowered into the well.

It is known, that when wells are drilled by means of an electric drill, the latter is retained on a drill column, inside which a leading-in current wire is arranged. In the process of extending the drill column, for example, during lowering the electric drill into the well, the leading-in current wires of separate stands or pipes of the string or column are connected by means of electrical connectors of a plug-and-jack type, in addition to this the extending contract element of one pipe entering the hollow contact element (socket or jack) of the other pipe. During lowering a drilling string, it is necessary to oil the contact surfaces of the elements of electrical connectors to prevent their mechanical wear and damage due to a considerable friction between the contact surfaces arising when making and breaking the connection as well as to a reliable electrical connection.

Usually a lubricant is applied onto the contact surfaces faces by means of a brush and for storage of the lubricant a heated reservoir or capacity is usually provided.

In this case it is impossible to ensure a uniform layer of the lubricant on the contact surfaces of the elements of the electrical connectors; moreover, considerable losses of the lubricant are observed, the lubricant becomes impure and moist, since the reservoir for the lubricant is not adequately tight.

It is an object of the present invention to provide an improved lubricator capable of ensuring accurate batching of the lubricant, its uniform distribution over the contact surfaces, impurity and losses of the lubricant during oiling being excluded.

Described in the present invention is a lubricator for oiling contact surfaces of the elements of electrical connectors of leading-in current wires in drill pipes to which the electric drill is attached. According to the invention, to the reservoir or capacity of this lubricator to be filled with the lubricant, a removable casing is attached, the shape of the casing being congruent to the elements of electrical connectors. From the side adjacent to the connector elements the casing is covered with elastic material that has through pores, the side of the casing contacting the elastic material being provided with open grooves communicating with the reservoir and serving to supply the lubricant to the elastic material which absorbs the lubricant.

The novel feature of the invention also resides in that the grooves of the casing communicate with the reservoir containing the lubricant through a periodic-action-metering device disposed in said reservoir.

In the preferred embodiment the metering device comprises a cylinder with ports in the sidewall thereof, the cylinder accommodating a piston connected with a rod that carries a return spring, a cutoff valve being provided in the outlet opening of the metering device in the end face of the cylinder.

The present invention makes it possible to apply a uniform layer of lubricant onto the contact surfaces, castor oil or any other oil with the same viscosity being used for the purpose.

Due to the fact, that the entire amount (batch) of oil used for lubricating is entirely contained in the pores of the elastic material that covers the casing and is subdivided into small, almost isolated volumes, the forces of adhesion between the oil and the material will exceed the weight of the oil, and therefore the oil will not bleed from the press of the elastic material. When the casing of the lubricator is put onto the contact element of the electrical connector, the oil is pressed out of the pores and discharges onto the contact surface; when the lubricator is removed, excess oil from the surface of the contact element returns into the porous material. Thus, any losses of oil during lubrication are excluded.

The invention is further exemplified by the description of an embodiment thereof with reference to the accompanying drawings, wherein.

Figures 1, 2:
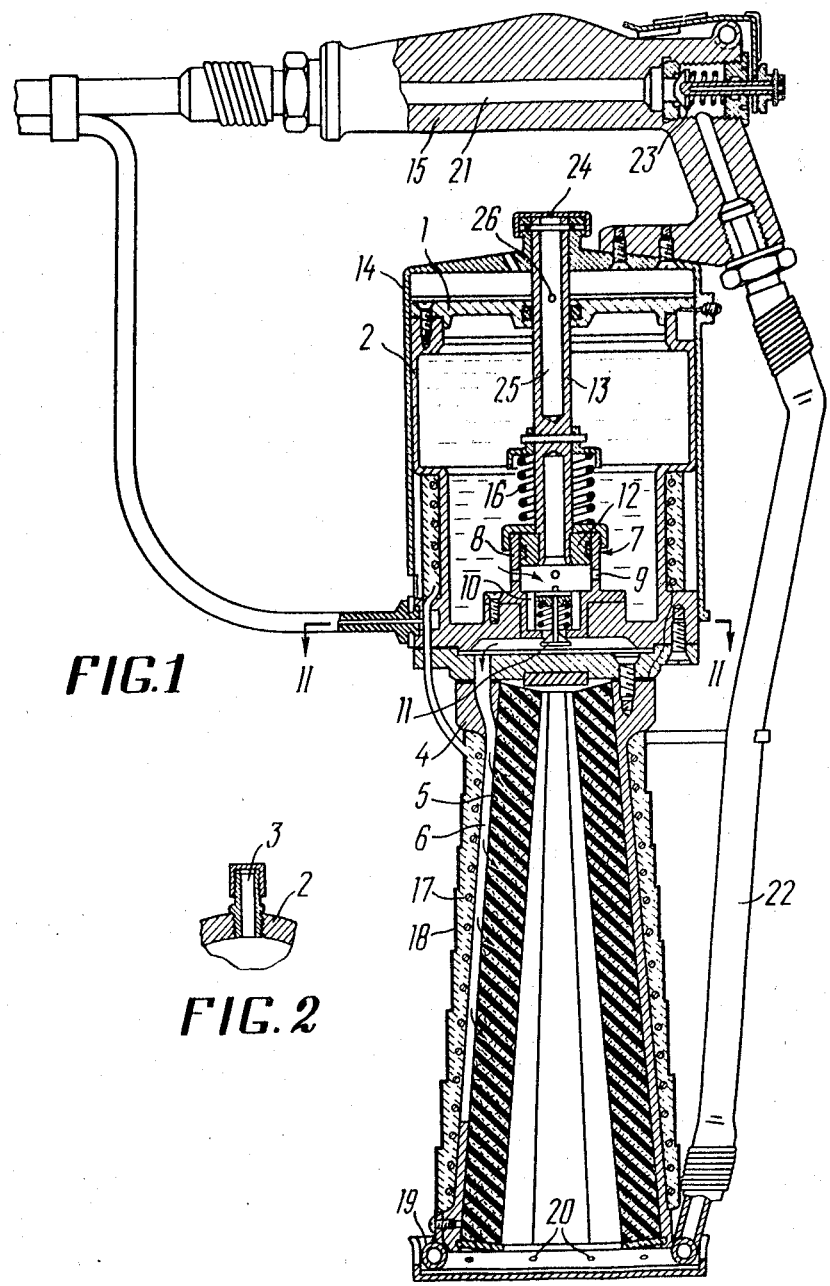
FIG. 1 shows a vertical sectional view of a lubricator with a casing congruent in shape to the extending element of the electrical connector.
FIG. 2 is a section taken along II—II of FIG. 1.

The lubricator shown in FIG. 1 comprises a hermetic reservoir 2 closed by a cover 1, the reservoir, through an opening 3, being filled with a lubricant, particularly, with castor oil (FIG. 2). Attached to the bottom portion of the reservoir 2 is a removable casing 4 (FIG. 1) conforming in shape to the elements of electrical connectors (not shown), the casing being covered from the side adjoining the contact surface of the element with elastic material 5 having through pores.

When the lubricator is used for oiling the projecting elements of electrical connectors, a casing is employed, which is covered with a porous material from the inside, as shown in FIG. 1, and for oiling sockets of electrical connectors said casing is replaced by a casing (not shown) which is covered with porous material from the outside, though practice has shown that it will be sufficient to oil only the projecting elements of electrical connectors.

The casing 4 from the side covered by the elastic porous material 5 is provided with open grooves 6 which communicate with the reservoir 2 and serve to supply the lubricant to the porous material 5 which absorbs the lubricant.

From the reservoir 2 the lubricant is periodically supplied to the grooves 6 through a metering device 7 accommodated in the reservoir 2. Said metering device comprises a cylinder 8 with ports 9 in the sidewall thereof and with an outlet opening 10 in the lower end face, a cutoff valve 11 being provided in said opening 10. The cylinder 8 accommodates a piston 12 connected with a rod 13; the latter being associated with a cap 14 movable relative to the reservoir 2 and connected with a handle 15. When the handle 15 is pressed downwardly, the cap 14 moves in an axial direction together with the rod 13 and piston 12. The cap 14 with the rod 13 are returned to the initial position by means of a spring 16.

To prevent congelation (thickening) of the lubricant, coiled heating elements 17 are put onto the reservoir 2 and the casing 4, said elements being connected to a power supply source (not shown) and enclosed by a protective shell 18.

At the free end of the casing 4 an annular tube 19 is provided with a plurality of openings 20 at the side adjoining the casing for the passage of compressed air required to clean the contact elements, fed along pipelines 21 and 22 when valve 23 is opened.

The proposed lubricator operates as follows:

The casing of the lubricator is put onto the projecting element of the electrical connector as far as it can go. The porous material on the internal surface of the casing envelops the element and a portion (batch) of the lubricant is pressed out onto the element and remains on the contact surface thereof. When the lubricator is removed from the element, the porous material regains its initial shape and absorbs the excess lubricant.

To replenish the lubricant consumed from the porous material, it is only necessary to press the handle 15 after the lubricator has been put onto the projecting element as far as it can go. The rod 13 and the piston 12 associated therewith, having overcome the effort of the spring 16, will start moving in the cylinder 8, forcing out the lubricant through the ports into the reservoir 2. When the piston 12 overlaps the ports 9 of the cylinder 8, the valve 11 will open and a batch of the lubricant will enter the grooves 6 and further pass into the porous material 5.

The pressure in the reservoir 2 does not vary as the lubricant is consumed and remains at atmospheric pressure since each time that the spring 16 is compressed, the reservoir 2 communicates with the atmosphere through openings 24 and a duct 25 in the rod 13 and through an opening 26 which is under the cover 1, when the rod 13 moves.

The invention proposed herein makes it possible to facilitate and improve the process of oiling the contact elements of electrical connectors of leading-in current wires in drill pipes.

What is claimed is:

1. A lubricator for lubricating the contact surfaces of electrical connector elements of leading-in current wires in drill pipes connected with an electric drill, said lubricator comprising a reservoir for containing a lubricant, a removable casing attached to said reservoir and adapted for interfitting with an electrical connector element, elastic material connected to and extending along said casing on one side thereof for contact with said electrical connector element, said elastic material being porous and elastic for passing lubricant therethrough to said electrical connector element and also for absorbing excess lubricant therefrom when the latter is disconnected from the casing, means defining open grooves in said casing on the side thereof along which the elastic material is connected to define a flow path of lubricant through said elastic material to the electrical connector element, said grooves communicating with said reservoir to supply lubricant from the reservoir to said elastic material and thence to said electrical connector element, said electrical connector element being otherwise isolated from the reservoir and the lubricant therein, and a periodic-action-metering device submerged in said reservoir for expelling lubricant to said grooves and thereby to said elastic material.

2. A lubricator as claimed in claim 1, wherein the grooves of the casing communicate with the reservoir through said periodic-action-metering device arranged in said reservoir.

3. A lubricator as claimed in claim 2, wherein the metering device comprises a cylinder having ports in the side thereof communicating with said reservoir and through which excess lubricant is expelled into said reservoir, and a piston accommodated in said cylinder, a rod connected to said piston, a return spring fitted on said rod, and a cutoff valve provided in the output opening of the metering device in the end face of the cylinder, said cutoff valve being responsive to the movement of said piston after said piston has been moved to close said ports.

* * * * *